United States Patent
Flockhart et al.

(10) Patent No.: US 6,839,419 B1
(45) Date of Patent: Jan. 4, 2005

(54) RING NETWORK IMPLEMENTED BY TELEPHONY SWITCHES AND LINKS

(75) Inventors: Andrew Derek Flockhart, Thornton, CO (US); Robert Daniel Nalbone, Thornton, CO (US); Thomas S. Fisher, Westminster, CO (US); Eugene P. Mathews, Barrington, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 730 days.

(21) Appl. No.: 09/001,729

(22) Filed: Dec. 31, 1997

(51) Int. Cl.[7] .......................... H04M 7/00; H04L 12/28; H04L 12/56

(52) U.S. Cl. .................. 379/219; 379/230; 379/265.02; 370/403; 370/524

(58) Field of Search .......................... 379/219, 220.01, 379/221.01, 229, 230, 242, 243, 93.01, 93.05, 93.09, 265.02; 370/352, 403, 404, 405, 452, 524

(56) References Cited

U.S. PATENT DOCUMENTS

| | | | | |
|---|---|---|---|---|
| 5,182,750 A | * | 1/1993 | Bales et al. | 379/230 |
| 5,499,290 A | * | 3/1996 | Koster | 379/230 |
| 5,506,898 A | * | 4/1996 | Costantini et al. | 379/266 |
| 5,680,589 A | * | 10/1997 | Klingman | 395/500 |
| 5,740,238 A | * | 4/1998 | Flockhart et al. | 379/221 |
| 5,754,639 A | * | 5/1998 | Flockhart et al. | 379/221 |
| 5,761,412 A | * | 6/1998 | Higgins | 379/243 |
| 5,912,887 A | * | 6/1999 | Sehgal | 379/230 |

OTHER PUBLICATIONS

Newton's Telecom Dictionary, Version 14, p. 799, Mar. 1998.*

* cited by examiner

Primary Examiner—Benny Tieu
(74) Attorney, Agent, or Firm—David Volejnicek (57) ABSTRACT

A system for using an under-utilized data channel for carrying additional data, in a network mode. One such channel is the D-channel in the ISDN system. In one implementation, a group of telephone call centers share data, using the D-channel, about the lengths of time incoming callers must wait before being answered. Using the shared data, the call centers collectively route incoming calls to call centers having smaller waiting times.

7 Claims, 6 Drawing Sheets

RING NETWORK IMPLEMENTED BY TELEPHONY SWITCHES AND LINKS

TECHNICAL FIELD

This invention relates to telephony networks and to the communication of control information in such networks.

BACKGROUND OF THE INVENTION

Conventional telephone networks comprise a plurality of telephone switching systems interconnected by telephone links, principally trunks, and sometimes lines. The links carry telephony traffic (or calls) and traffic-related (or call-associated) signaling between the switching systems. The switching systems normally have no capability to communicate control information to each other, apart from the call-associated signaling.

If it is desired to communicate additional control information between the switching systems, they must be interconnected by a data network. But the construction and provision of an additional network is expensive. Nor are all of the capabilities of a full-fledged separate data network typically needed. All that the switching systems usually require are the following three features:

1) The ability, at all times, of near-instantaneous broadcast,
2) of small amounts of data,
3) From one switching system to all others.

To avoid the need for a separate data network, the art has developed the temporary signaling connection, or TSC. The TSC uses non-call-associated signaling across telephone links to implement a data network. However, the TSC provides only point-to-point communications capability, and this requires that each pair of nodes that wish to communicate with each other be connected by a direct link. Moreover, each node must keep a database of information that defines the web of links that connect the node to other nodes and indicates which link connects to which remote node. Both of these characteristics make the TSC impractical for networks comprising more than a few nodes.

SUMMARY OF THE INVENTION

The purpose of the invention is to provide a more efficient and lower cost method for passing data between telephony switches, with call center-type PBX switches being a primary example for use of this concept. This invention makes unique use of computer industry local area networking concepts for passing data between a network of telephony switches.

One purpose of the invention is to provide a "Switch LAN" concept that uses existing ISDN type networks installed for connecting voice/data calls as a vehicle for inter-switch/call center data communication when configured in a Local Area Network (LAN) like network. A LAN-like network allows broadcast capabilities where the site sending a message does not need to be directly connected with all other sites nor know about the existence of those sites. The LAN-like network can be viewed as a token-ring network where each site to receive or send data has two connections to the network. A sending (or outgoing) connection to the next site in the ring, and a receiving (or incoming) connection to the previous site in the ring. Data is transmitted to all sites in the ring by sending a packet of data (called a token) to the next site in the ring which tandems the token to the next site, etc., until the site that sent the token receives the same token back. Only the sites interested in the token will actually look at and store the token of data. Examples of networks or facilities that can be used with this approach are (1) Temporary Signaling Connections (TSCS), (2) Call Independent Signaling over the ISDN D-Channel, or (3) "nailed-up" voice telephone line connections using voice/data grade trunking arranged in a ring configuration.

The approach outlined in the invention is to send the data via user-to-user information signaling (UUI) over non-call associated (or call independent signaling) Temporary Signaling Connections (TSCS) on the D-channels of ISDN trunk facilities that already exist for call routing between PBX switches. The LAN-like collectivity is created by pre-assigning appropriate TSCs for receiving and sending messages as UUI. Each application that needs to share data using this method will have application software for sending, receiving and tandeming UUI and taking the required action on received messages. When a PBX is to share data, a UUI TSC message is sent on the D-channel to the next PBX in the ring network, and all other PBXs interested in the data will receive the message through their connection in the ring network (via tandeming of the token around the ring from PBX to PBX).

With this platform, PBXs can send data to specific PBXs in the network or broadcast the data to all other PBXs in the network without having to know the identity of each PBX or paths to take to make connections to the other PBX nodes. Only knowledge of the next PBX in the ring and the connection to the previous PBX and the next PBX is required. Prior art methods require separate data facilities that interconnect each of the PBXs and/or complex methods and databases to decide how to route the data from one location to the other or to each one using separate messages to each location which is to receive the data. That is, it is no longer necessary to maintain a pre-assigned database of which other PBX switches exist and how each can be addressed, and send the same message multiple times on numerous point-to-point connections.

The basic advantages of the invention are:
1. Lower cost:
   a) It can use existing telephone networks,
   b) It uses existing PBX switch processor with added software,
   c) It requires no new hardware, and
   d) It requires no separate host LAN/data network.
2. Increased speed: time sensitive data is shared quickly via broadcast capability (this is important for the sharing of current waiting times invention).
3. Greater efficiency:
   a) The invention does not require pre-assigned data bases containing the identities and routing instructions to each of the PBXs that will share the data,
   b) The invention saves processing of multiple message sending to send a separate message to each PBX, and
   c) The invention provides a simple method of adding new PBXs to the network; only connections and configuration information at the next and previous PBXs at the point where the PBX is added need be changed.

DETAILED DESCRIPTION

An example of use of this concept is in a multi-site call center network to provide intelligent and quick method for re-routing (interflowing) calls from a busier call center to one that is less busy (referred to as Network ACD). The idea in this example is for each call center to share its waiting time data among all other call center sites in the customer network using the method of the invention so that when a routing decision needs to be made, the data is already available and up-to-the-second and timely.

There is an inherent efficiency and economy of using a ring type of communication method where each call center does not need a connection to each other call center in a customer network and does not need to know ahead of time about the existence of the other call centers. Also, existing voice networks can be used without requiring addition of special data networks or added facilities or hardware.

Operation to share waiting time data among call center systems, or sites, or locations using this method is as follows:

a) Normal (ring intact)—Each call center has an outgoing connection to the next call center in the network and an incoming connection to the previous call center in the ring configuration. A data packet from each call center (with the current status of that call center) is passed or circulated from call center to call center, during which time each call center updates the data in its own status table with the received information, and stores the updated data before passing it on to the next call center. When the data packet returns to the sender system, the tandeming of that packet stops and the packet is deleted. The process is periodically repeated.

Figure 1:
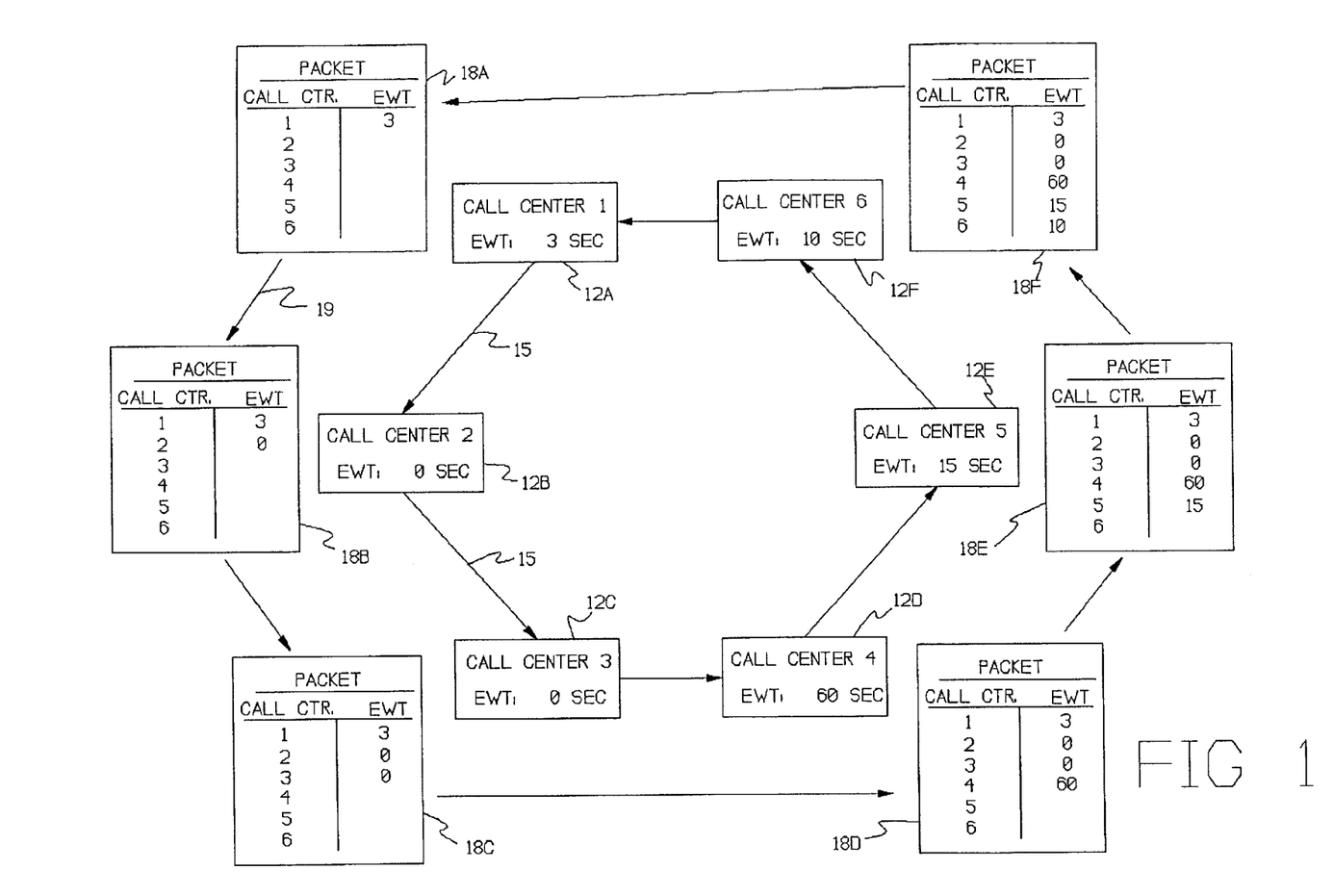
FIG. 1 illustrates circulation of a data packet in a ring-type network.

FIG. 1 is a flow chart illustrating this approach. Assume, for simplicity, that operation of the call centers has just begun. At this time, call center 12A initiates the packet 18A, by entering its current EWT of "3" in its row, which is labeled "1" in the column labeled "CALL CTR." "EWT" is a parameter which the call centers wish to share, and refers to Estimated Wait Time for calls which arrive at the center.

This call center 12A passes the packet 18A to call center 12B, as indicated by arrow 19. The latter call center 12B (a) reads the EWT of the transmitting call center, namely call center 12A, (b) adds its own current EWT, which is "0" in this example, and (c) passes the status table to the next call center. This process continues, wherein each call center (a) reads the EWT's of the other call centers, (b) adds its own current EWT, and (c) passes the updated packet to the next call center.

b) Ring broken (trunk or call center switch down)—If the ring becomes broken, the network effectively becomes a "bus" or linear network. Each system detects that it has failed to receive transmittal of data. Each system then sends its own data packets back to the previous system and forward to the next system. Each system that receives another system's packet then sends the packet to its other adjacent system, and so on. This continues for each update period until; each system detects receipt of its own packet. At this time the network reverts back to a ring configuration.

Figure 2:
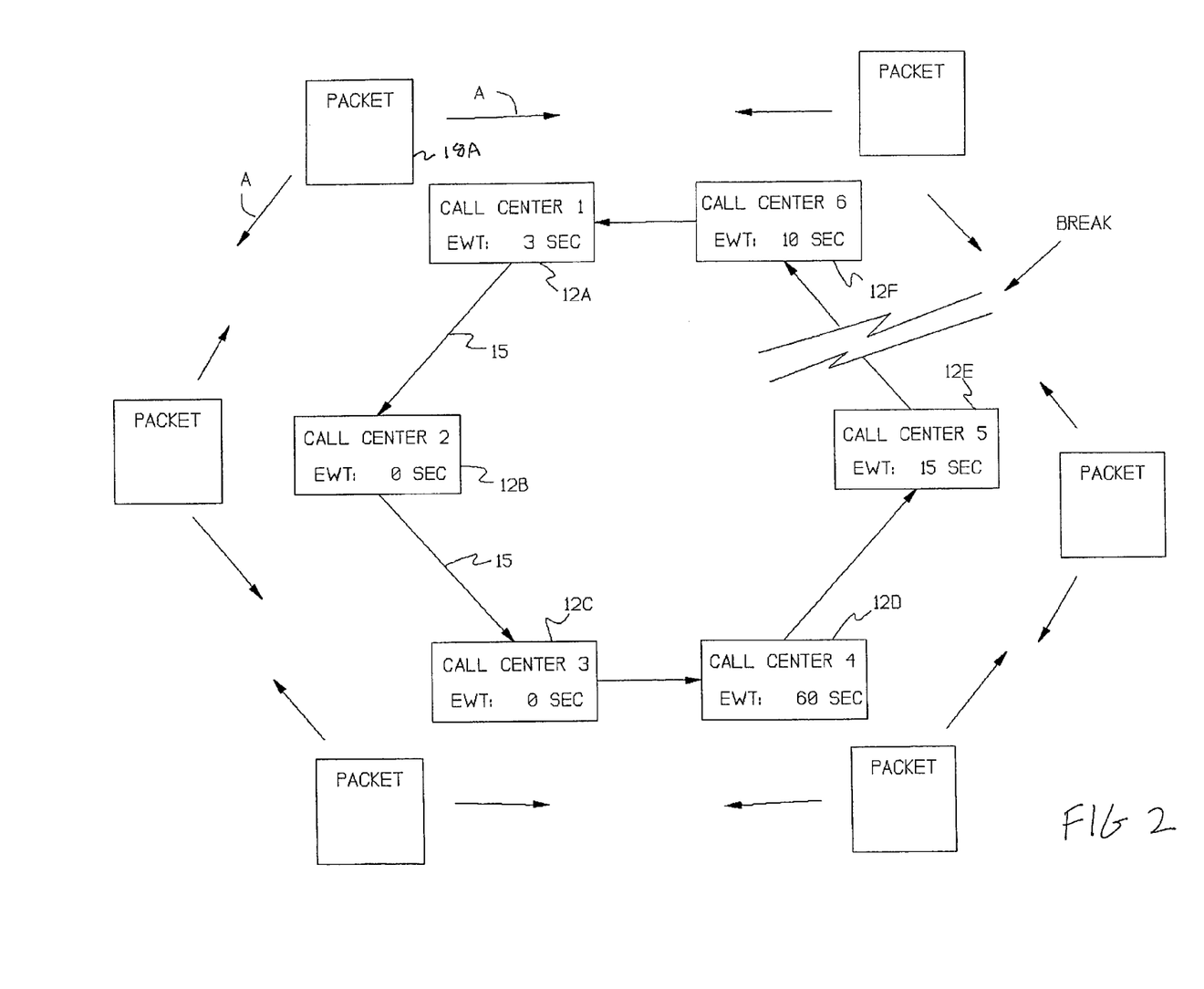
FIG. 2 illustrates shuttling of a data packet when a BREAK occurs in the ring of FIG. 1.

FIG. 2 illustrates this operation. The ring has broken at the point labeled BREAK, between centers 12E and 12F. The goal now is to utilize the intact links to distribute the packets. Each center, such as center 12A, sends packet 18A in two directions, as indicated by arrows A: packet 18A is sent to center 12B, and also to center 12F. In addition, the receiving centers 12B and 12F forward this packet, if possible, so that all centers receive the packet. When a center receives its own packet, it concludes that the BREAK has disappeared, and ring-type operation resumes.

An embodiment can be derived by dividing the operations of the invention into two generalized functions, namely, (1) data-transfer among centers, and (2) implementation of a process at each center, using the data transferred.

As to function (1), in the generalized form of the invention, small amounts of data of any type are transferred. For example, a collection of centers transfer a packet of data, serial-fashion, from one center to another. Each center reads the packet and forwards it, as appropriate.

Figure 3:
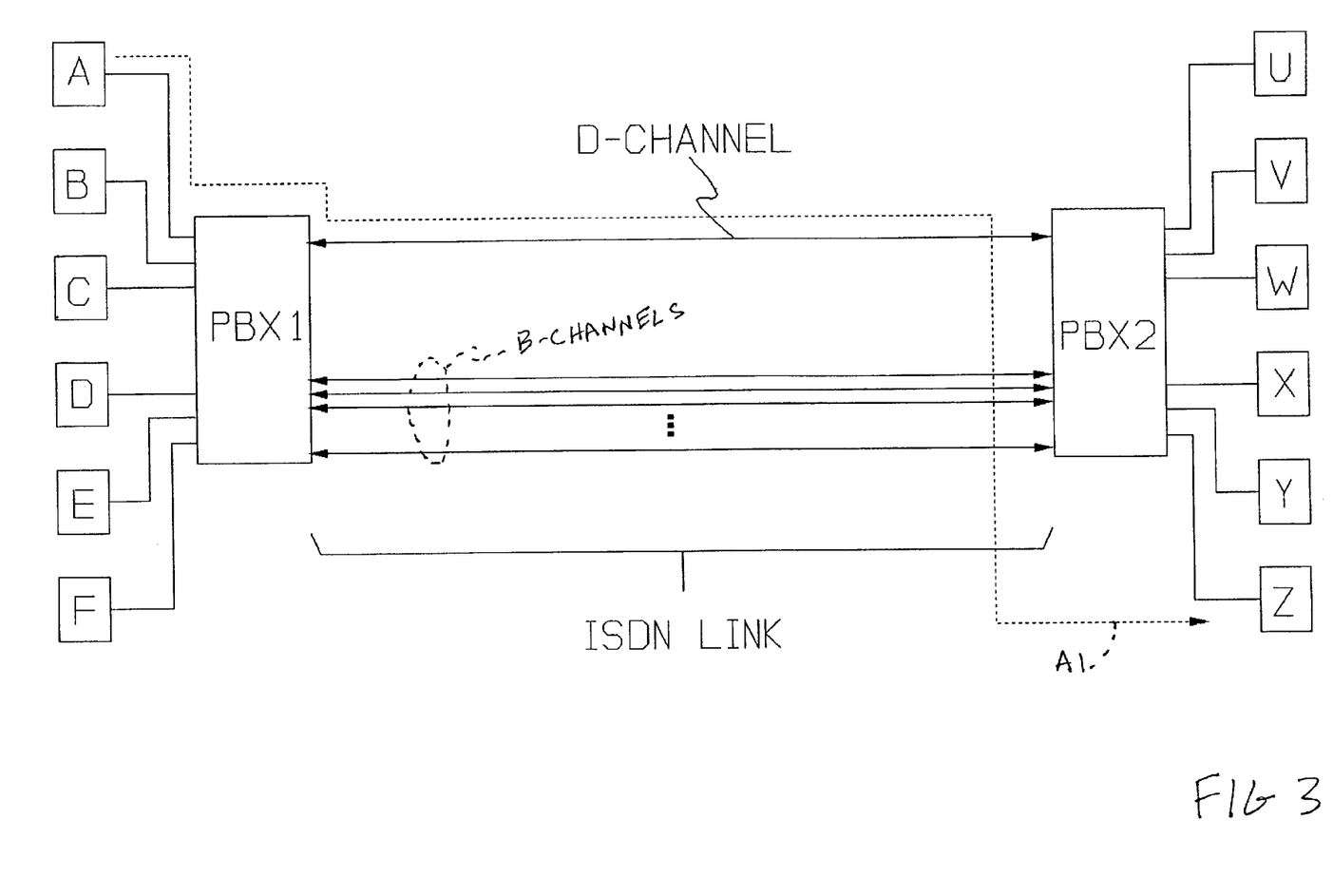
FIG. 3 illustrates routing of a data packet, using a D-channel of an ISDN-type system, from client A to client Z.

As to function (2), FIG. 3 illustrates two PBX's (PBX: Private Branch Exchange) connected by an ISDN link. The ISDN channel contains one D-channel (D: Data) and multiple B-channels (B: Bearer). The boxes labeled A–F and U–Z represent the clients served by the PBX's. The clients may take the form of ordinary telephones, or more advanced devices, such as computers or call centers.

For present purposes, a simplified explanation of the operation of the ISDN channel will suffice. Assume that client A wishes to call client Z. Client A notifies PBX1 of this fact. PBX1 selects one of the B-channels to carry A's call. In addition, PBX1 places a message onto the D channel which, in effect, informs PBX2 that (1) an incoming call is about to arrive, (2) the specific B-channel which will carry the incoming call, and (3) the destination of the incoming call, which is client Z. In response, PBX2 routes the call, when received, to Z.

Systems which utilize these basic functions are termed ISDN-type herein.

A significant feature of this architecture of the ISDN system is that the duty cycle of the D-channel is quite small. That is, the D-channel is used only to carry the data packets just described, and this packet carriage only occurs when calls occur. The bandwidth of the D-channel is not fully utilized.

Figure 4:
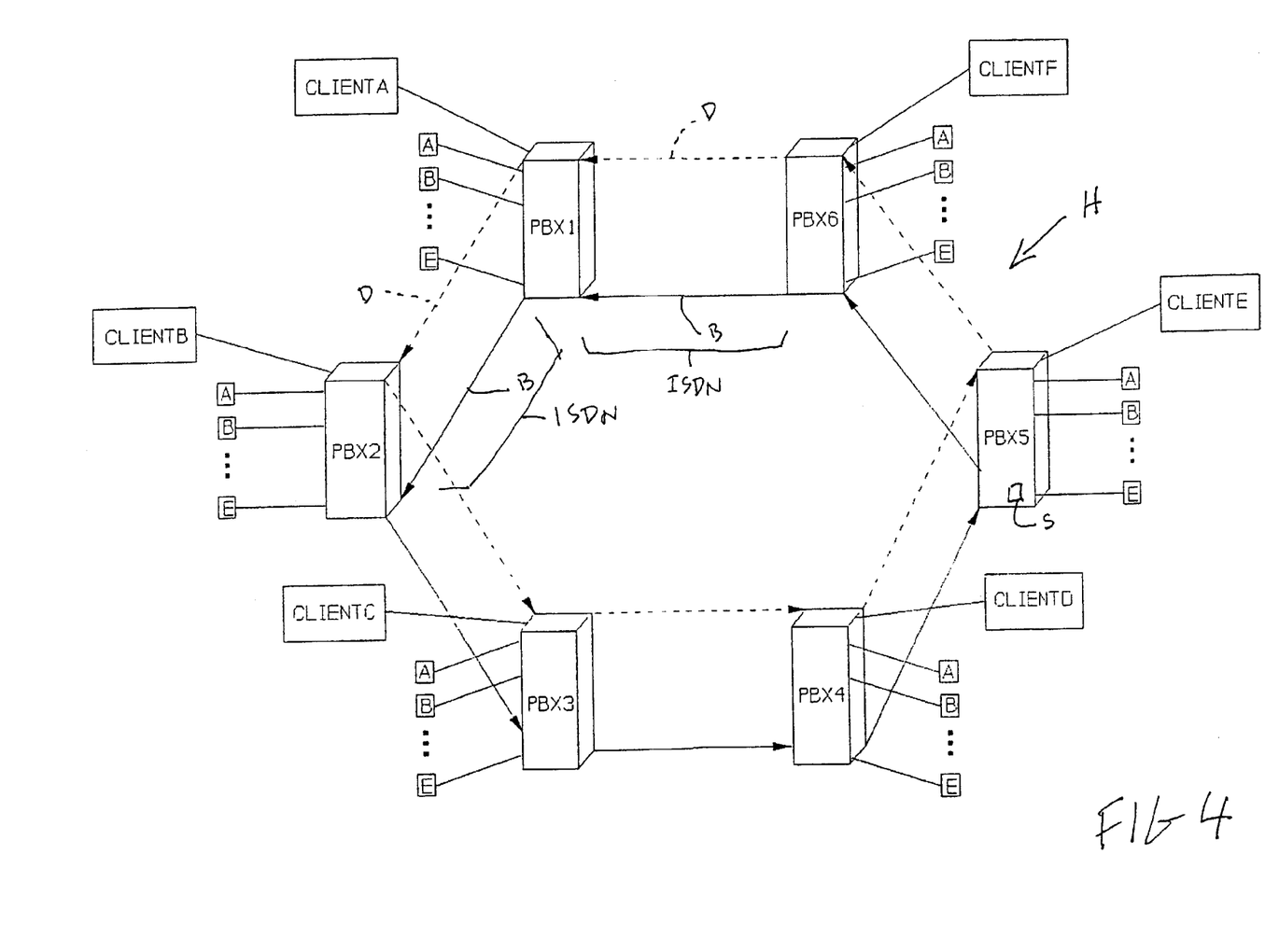
FIG. 4 illustrates PBXs configured in a ring network, using ISDN links.

One form of the invention increases utilization of the D-channel, and is illustrated in FIG. 4. Six PBX's are shown, with ISDN channels linking-them together. Of course, the PBX's are actually linked together only when their respective clients communicate with each other. If no clients are presently communicating, the ISDN lines are dormant. In FIG. 4, in addition to the normal clients A–F of each PBX, one or more special clients may exist, labeled CLIENTA through CLIENTF.

When a normal client A–F wishes to call another normal client, the system operates as described above, in connection with FIG. 3. The D-channel is used to carry information necessary to establish a call, and one of the B-channels carries the call itself.

In addition to this normal usage, the invention uses the D-channel to carry data, independent of normal calls. For example, CLIENTA may wish to transmit a data packet to CLIENTB. In such a case, CLIENTA obtains access to the D-channel, through PBX1, and transmits the data packet to CLIENTB, through PBX2. But no call is placed on a B-channel. This usage is illustrated in FIG. 3, by arrow A1. A packet is carried from client A to client Z, along the D-channel.

Thus, under the invention, the D-channel is used to carry two types of data packets, which will be termed (1) "call-associated," which are used in conjunction with controlling normal calls, and (2) "data packets," which are not involved in call control, but carry data to be transferred from one client to another.

The receiving PBXs must be equipped with software which handles the two types appropriately. For example, each data packet may be labeled with a header, as to its type: "call-associated" or "data." Both packet types may identify the intended recipient, or destination. Each PBX is equipped with logic, illustrated in FIG. 5, which does the following.

Figure 5:
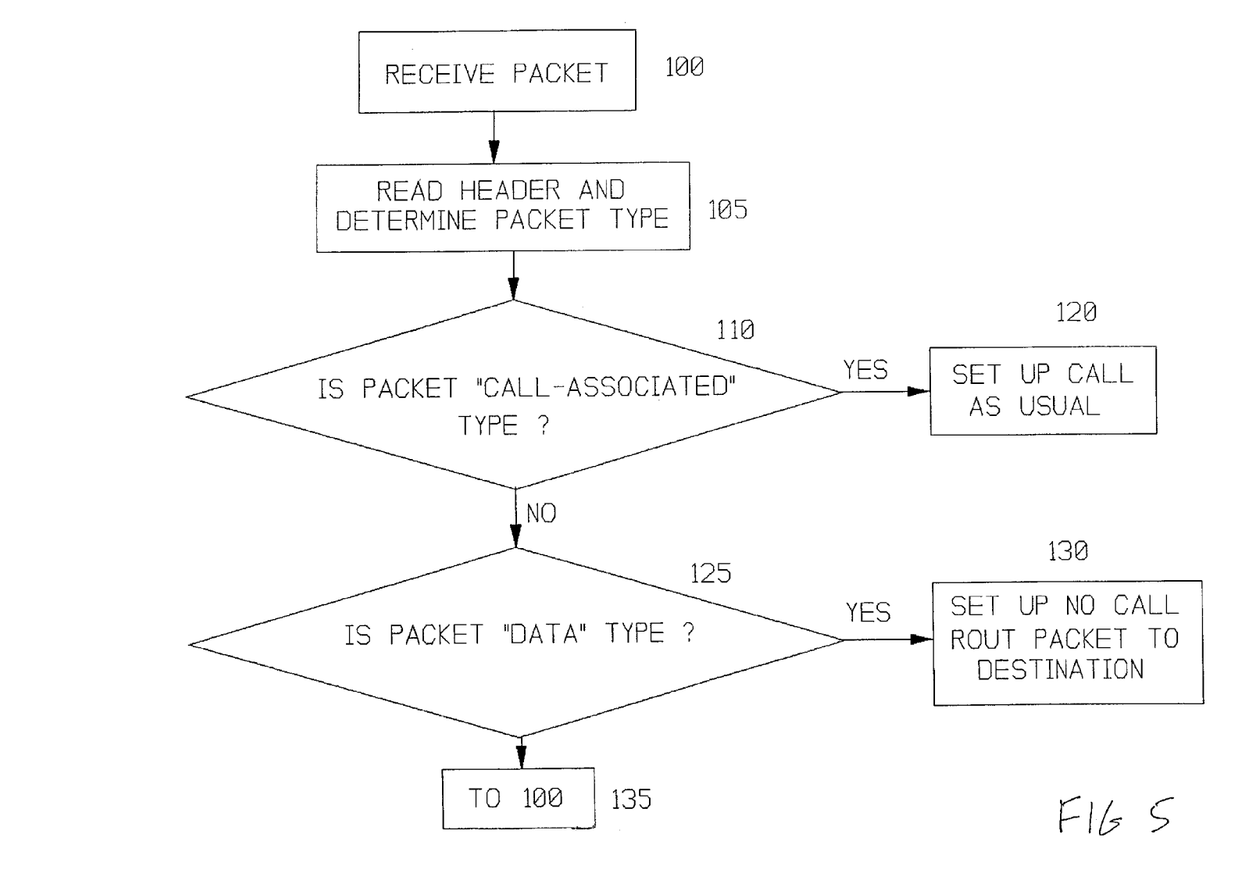
FIG. 5 is a flow chart of logic implemented by one form of the invention.

1. The logic receives the packet in block 100 and determines the packet type in block 105.
2. For "call-associated" packets, the logic sets up a call as usual, as indicated by blocks 110 and 120.
3. For "data" packets, the logic routes the packet itself, as indicated by blocks 125 and 130. The logic returns to block 100 from block 135.

In the example mentioned earlier, the data packet received from CLIENTA is received by PBX2, and routed to CLIENTB. Note that no such routing occurs in "call-associated" packets.

In another form of the invention, the data packets are relayed from one PBX to another. In this form of the invention, each PBX is assigned a PBX as a relay recipient. In FIG. 4, for example, PBX1 is assigned PBX2. PBX2 is assigned PBX3, and so on. Each PBX knows the signaling connection leading to its relay recipient.

Whenever a PBX receives a data packet, on the D-channel, it ascertains the origin of the data packet. If the origin is one of the PBX's own clients, it routes the packet to only that client, and the packet disappears. If the origin is not one of the PBX's clients, the PBX both routes the packet to its clients and relays the packet to its relay recipient.

The relay recipient repeats this operation, and the operation is repeated until the packet reaches that PBX which handles the client identified as the origin. When a data packet returns to its originator, the originator learns that the ring, one of which is indicated by the hexagon H in FIG. 4, is functioning properly.

The network can be expanded in a simple manner. For example, a new PBX7 can be spliced into FIG. 4, between PBX6 and PBX1. PBX6 is re-assigned a new relay recipient, namely, PBX7, and PBX7 is assigned PBX1 as its relay recipient.

Figure 6:
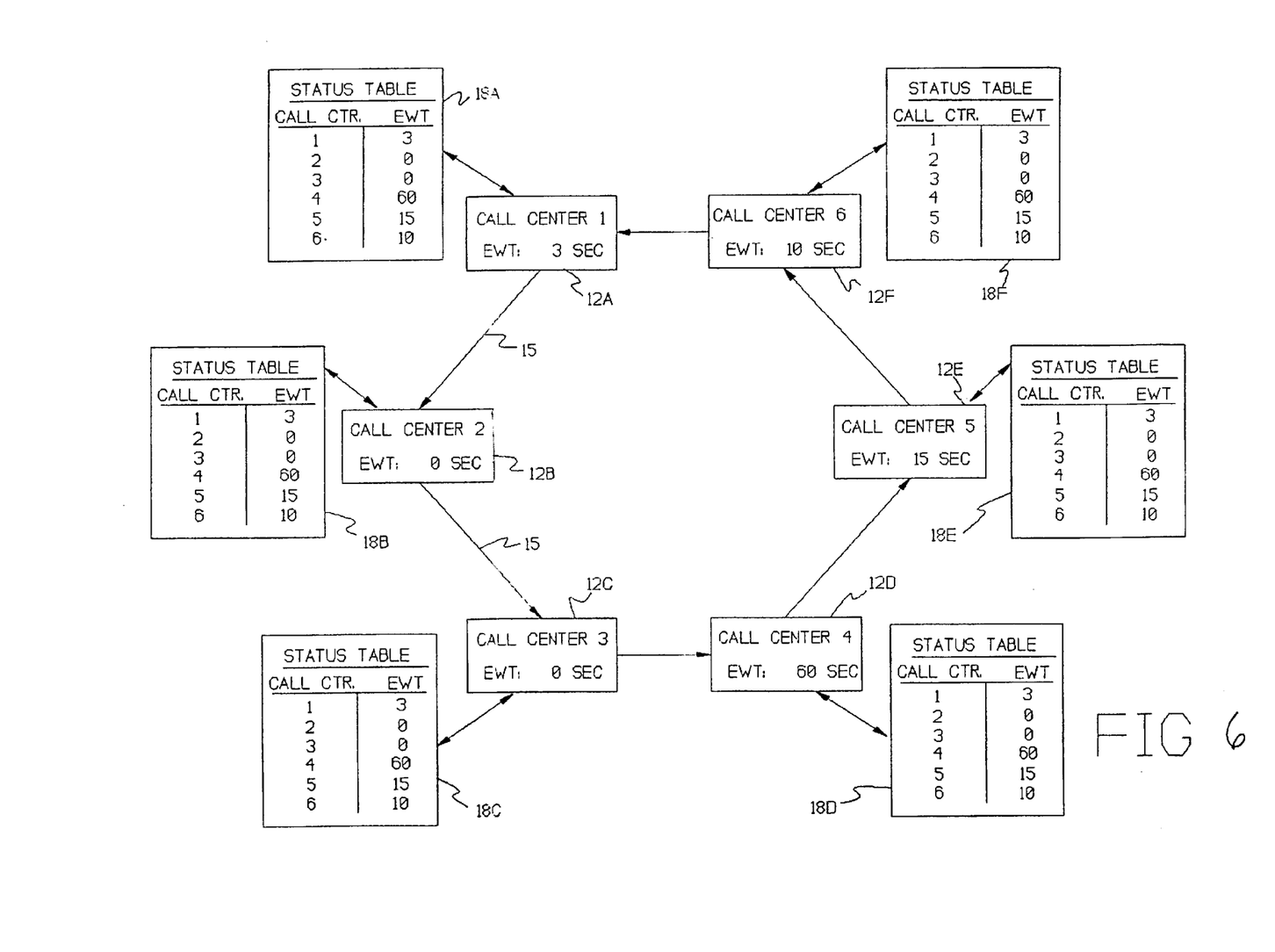
FIG. 6 illustrates one form of the invention.

As shown in FIG. 6, each center maintains a status table 18. The status tables 18 indicate the EWT's for all other centers. All status tables are shown as identical, and each center is shown as storing its own EWT in its own status table. However, in practice, it is perhaps not necessary that a given center maintain its own EWT in its own status table 18. However, since each center 12 does, in fact, know its own EWT, that fact is indicated by an entry in the status table for that center.

The EWT's change as time progresses, so that the status tables must be updated. One approach to updating is a "series"-type approach, in which a plurality of data packets, each of which represents the EWT of a different center, is circulated among the centers. FIG. 6 illustrates this approach. Assume, for simplicity, that operation of the centers has just begun. At this time, center 12A initiates the status table 18A, by entering its current EWT of "3" in its row, which is labeled "1" in the column labeled "CALL CTR."

This center passes a packet with its identity and its EWT to center 12B, as indicated by arrow 19. The latter center 12B (a) reads the EWT of the transmitting call center, namely center 12A, (b) adds the EWT to its own status table, and (c) passes the packet to the next center. Meanwhile, center 12B sends out its own packet with its identity and its EWT.

This process is repeated at each call center, wherein each center (a) receives the EWT's of the other call centers, (b) sends out its own current EWT, and (c) passes these EWTs to the next center.

Once the status tables are created, and maintenance of them continues, all call centers remain in possession of the EWT's of all other call centers.

ADDITIONAL CONSIDERATIONS

1. The network 15 in FIG. 2 should allow 1) at all times, near-instantaneous broadcast
   2) of small amounts of data
   3) from one call center to all others.

Such a network can be termed an "active," or "nailed up" network.

Another view of the near-instantaneous-broadcast feature is that the small amounts of data are transferred without any delays attributable to establishment of a communication link. The link is already established. No delays are present which are attributable to factors such as dial-up time, or switching time within a telephone system.

For example, transfer of a "small" packet of such data, from one client to another, such as from client A of PBX1 in FIG. 13 to client E of PBX4 should be completely executed in about 100 milliseconds.

2. Every call center, through its possession of the EWT's, knows where to route its incoming calls. It is not required to query a remote facility in locating a target call center. Thus, the routing decision is performed almost instantaneously, with the only delays being those due to computation time, which are considered insignificant. In the prior art, an additional delay is imposed, namely, that due to communication and interrogation of a remote facility, to ascertain an appropriate destination to which to route a call.

3. The loop-type, or ring-type, network shown in FIG. 6 possesses a significant advantage. If a call center malfunctions, then the loop becomes broken. The malfunction can be detected from the absence returns to a center of its own packet. For example, if a return is not received by a given call center for a period of, say, twenty seconds, then ring network is deemed to have malfunctioned.

For example, assume that center 6, labeled 12F, in FIG. 6 malfunctions. The previous loop-type network is now converted into a linear network running from center 1 to center 5. Each call center that detects the malfunction continues to handle other call centers' packets as before, but now transmits its own packet in both directions. Each call center that receives a packet on a link on which it normally transmits packets retransmits that packet on the link on which it normally receives packets. Hence, the packets do not circulate, but are shuttled to both ends of the linear network.

When the malfunction is corrected, and center 6 becomes operational again, then the system returns to normal loop-type operation.

This failure mode can also be applied if more than one call center malfunctions. If two non-adjacent call centers fail, then two linear networks are created, one of which may contain a single call center. The two linear networks operate independently, as described in the failure mode above. If one of the linear networks contains a single call center, then, of course, that call center operates autonomously.

4. The preceding discussion has presumed EWT to be the preferred parameter to govern call routing. However, other parameters can be used, such as    a) length of time each agent has been idle,
   b) the percentage of time each agent has been occupied with calls; or
   c) skill level of each agent.

Calls can then be routed to the most idle agent, least occupied agent, or the agent having the highest level of skill, as desired.

5. The frequency at which the status tables are updated is controlled by the user of the invention. For example, the frequency can be determined by an appropriate variable contained in the software running at each call center. The user sets this variable to a desired value, which may be different for each call center.

Each call center notifies the others of its own EWT, and updates its status table, at the frequency indicated by the frequency variable. For example, a high frequency of updates may be desired during normal business hours, but a lower frequency may be desired during night-time hours. In some instances, different call centers may update their status tables at different frequencies than other call centers in the same system.

These call centers may be programmed in advance, to adopt a frequency which is a predetermined multiple, or fraction, of the frequency variable in the circulating status table. Alternately, each call center may be assigned a frequency, through its own frequency variable contained in the circulating status table.

6. Software which performs the functions described herein is contained in each PBX, or call center, which are also called nodes. As an example, software S in PBX5 in FIG. 4 represents this software. Similar blocks are contained in the other nodes, but are not shown, to avoid clutter.

It is understood that PBX's contain memory, processors, and other components, configured in an architecture which supports the prior-art routing functions described above, and supports the additional programming described herein. This architecture is not illustrated, because it is a known aspect of the PBXs.

7. The links need not be an ISDN link, but can be any telephony link, e.g., any analog or digital telephony trunk or line.

Numerous substitutions and modifications can be undertaken without departing from the true spirit and scope of the invention. What is desired to be secured by Letters Patent is the invention as defined in the following claims.

What is claimed is:

1. In a telephone network comprising a plurality of telephone switching systems each having a processor and interconnected by a plurality of telephone links for transporting telecommunications calls and call-associated signaling between the switching systems, the improvement comprising:

each switching system having information-receiving-means connected to the processor and to a first one of the telephone links leading to a second switching system and information-transmitting means connected to the processor and to a second one of the telephone links different from the first link and leading to a third switching system different from the second switching system, such that all of the switching systems are connected together in a ring by the links each one of which is connected to a receiving means at one of the switching systems and to a transmitting means at another of the switching systems;

each information-transmitting means responsive to receipt of non-call associated information from the processor of its switching system by transmitting the non-call associated information on its connected link accompanied by an identifier of one of the switching systems, and further responsive to receipt of non-call associated information from the information-receiving means of its switching system by transmitting the information on its connected link; and    each information-receiving means responsive to receipt on its connected link of non-call associated information accompanied by an identifier of its switching system by transferring the information to the processor of its switching system, and further responsive to receipt on it connected link of non-call-associated information not accompanied by an identifier of its switching system by transferring the information to the information-transmitting means of its switching system.

2. An individual telephone switching system for use in a telephone network comprising a plurality of telephone switching systems interconnected by a plurality of telephone links for transporting telecommunications calls and call-associated signaling between the switching systems, the individual telephone switching system comprising:

a processor;

information-receiving means connected to the processor and for connection to a first one of the telephone links leading to a second switching system of the telephone network;

information-transmitting means connected to the processor and for connection to a second one of the telephone links different from the first link and leading to a third switching system of the telephone network different from the second switching system;

so as to enable all of the switching systems in the telephone network to be connected together in a ring by the links each one of which connects to an information-receiving means like the information-receiving means of the individual switching system at one of the switching systems and to an information-transmitting means like the information-transmitting means of the individual switching system at another of the switching systems;

the information-transmitting means responsive to receipt of non-call associated information from the processor for transmitting the non-call associated information or its connected link accompanied by an identifier of one of the switching systems, and further responsive to receipt of non-call associated information from the information-receiving means for transmitting the information on its connected link; and    the information-receiving means responsive to receipt on its connected link of non-call associated information accompanied by an identified of its switching system for transferring the information to the processor, and further responsive to receipt on its connected link of non-call-associated information not accompanied by an identified of its switching system for transferring the information to the information-transmitting means.

3. A method of operating a group of ISDN-type data links, comprising the following steps:

a) linking a group of stations together, in a ring-network topography, using D-channels of the links; and    b) transmitting data from an originating station, through all other stations, and back to the originating station, using the ring-network, wherein the data contains routing parameters, which are
i) stored at each station after receipt, and
ii) used by each station in routing telephone calls.

4. Method according to claim 3, wherein the routing parameters comprise an estimated wait time, EWT, for each station.

5. Method according to claim 3, and further comprising the steps of c) accepting a call at a station;

d) routing the call, based on a destination chosen using the routing parameters.

6. A method of operating a telephone system which includes ISDN links, comprising the following steps:

a) using idle D-channels of the ISDN links, maintaining a ring-type network among nodes;

b) maintaining a status table at each node, which contains information which facilitates routing of calls to other nodes; and c) transmitting data on the ring-type network which updates the status tables.

7. Method according to claim 6, and further comprising the steps of:

d) receiving an incoming call at a node;

e) examining a status table and identifying a node to which to route the incoming call; and f) routing the incoming call to the node identified.

* * * * *